United States Patent
Tian et al.

(10) Patent No.: US 8,395,289 B2
(45) Date of Patent: Mar. 12, 2013

(54) BRUSHLESS DC MOTOR AND A RADIATOR THEREOF

(76) Inventors: Yu Tian, Shanghai (CN); Wenyan Jiang, Shanghai (CN)

( * ) Notice: Subject to any disclaimer, the term of this patent is extended or adjusted under 35 U.S.C. 154(b) by 225 days.

(21) Appl. No.: 12/935,845

(22) PCT Filed: Apr. 3, 2008

(86) PCT No.: PCT/CN2008/070665
§ 371 (c)(1),
(2), (4) Date: Sep. 30, 2010

(87) PCT Pub. No.: WO2009/121226
PCT Pub. Date: Oct. 8, 2009

(65) Prior Publication Data
US 2011/0018373 A1    Jan. 27, 2011

(51) Int. Cl.
H02K 1/32 (2006.01)
(52) U.S. Cl. .......... 310/61; 310/64
(58) Field of Classification Search .......... 310/52–59, 310/61–64
See application file for complete search history.

(56) References Cited

U.S. PATENT DOCUMENTS

| | | | | |
|---|---|---|---|---|
| 3,882,335 | A * | 5/1975 | Fries .......... | 310/61 |
| 5,982,064 | A * | 11/1999 | Umeda et al. .......... | 310/90 |
| 7,345,386 | B2 * | 3/2008 | Dano et al. .......... | 310/61 |
| 2002/0057022 | A1* | 5/2002 | Yamamoto .......... | 310/58 |
| 2002/0079755 | A1* | 6/2002 | Sunaga et al. .......... | 310/67 R |
| 2006/0226718 | A1* | 10/2006 | Yang .......... | 310/59 |
| 2006/0261689 | A1* | 11/2006 | Natsuhara et al. .......... | 310/64 |
| 2007/0252451 | A1* | 11/2007 | Shibuya et al. .......... | 310/64 |
| 2008/0205001 | A1* | 8/2008 | Saito et al. .......... | 361/697 |
| 2011/0221289 | A1* | 9/2011 | Wu et al. .......... | 310/64 |

FOREIGN PATENT DOCUMENTS

| | | |
|---|---|---|
| CN | 2047855 U | 11/1989 |
| CN | 2181123 Y | 10/1994 |
| CN | 2912081 Y | 6/2007 |
| CN | 101127469 A | 2/2008 |
| DE | 10340325 A1 | 4/2005 |
| DE | 102004037079 A1 | 3/2006 |
| JP | 10042520 A | 2/1998 |

OTHER PUBLICATIONS

International Search Report for PCT/CN2008/070665 dated Dec. 15, 2008 (with English translation).

* cited by examiner

Primary Examiner — Thanh Lam
(74) Attorney, Agent, or Firm — McCracken & Frank LLC

(57) ABSTRACT

A brushless DC motor (100) and a radiating device thereof are provided. The brushless DC motor (100) includes a bracket (110), a stator (120) mounted on the bracket (110) and a rotor (130) rotating around the stator (120), the bracket (110) has an inner chamber (112), the rotor (130) has an opening (134) facing the inner chamber (112), wherein the radiating device includes a first radiator (142) which is provided in the inner chamber (112) of the bracket (110) and is thermal coupled with the stator (120) through the bracket (110) so as to send the heat out of the stator (120), and a turbine (144) which is provided within the opening (134) of the rotor (130) and is facing a first end (142a) of the first radiator (142) so as to discharge the heat sent from the first radiator (142) out of the motor (100) while the turbine (144) is rotating. The radiating device is simple in structure, and solves the problem of heat discharging of the large power brushless DC motor.

12 Claims, 2 Drawing Sheets

BRUSHLESS DC MOTOR AND A RADIATOR THEREOF

FIELD OF INVENTION

Generally the invention relates to a brushless DC motor used for Manned Spacecraft and electric yacht, more specifically, relates to a high-power brushless DC motor and a radiator thereof.

BACKGROUND OF THE INVENTION

Although there are advantages for a brushless DC motor to have larger starting torque, adjustable speed by controlling frequency, high efficiency and no pollution, etc, the power of a brushless DC motor limits its application fields directly. For a long time, a brushless DC motor whose power is under 1 KW is mainly used in the fields of model airplane, household appliances and electric bicycle. Generally, a gasoline engine or a diesel engine is used as power in the application requiring larger power. In recent years, with the rising of environmental protection consciousness to reduce the discharge of carbon dioxide and noxious gas, there is a great tendency to replace an oil-fired engine with an electric motor as power. Presently the brushless motor whose power is 3-5 Kw has appeared in the market, mainly used in the electric car with 8 seats, the golf car and the sailing yawl, etc.

At present, the large power brushless motor whose power is over 5 Kw is seldom used because of the technique of controller, battery and the radiation problem. When the power of a motor gets larger, the power which the controller is required to bear gets larger, and the power which a controller can bear depends on the power transistor. Now the problems of the power transistor and the battery of the large power motor are about to be solved, however the resulting radiating problem still hasn't been solved effectively. A large power motor can generate huge amounts of heat, and the components of the motor are easily to get burnt if the heat can't be released effectively in time.

A conventional brushless motor whose power is over 15 Kw is large-sized and heavy, and uses a liquid cooling system to solve its heat radiation problem. Its structure is complicated, that's why the application of a brushless motor whose power is over 15 Kw is rare and this kind of motor is only used in industry, while it is not applicable in the fields of manned spacecraft and skiff, etc.

Therefore, persons skilled in the art are longing for developing a brushless motor whose power is 5 Kw or over, which is suitable for manned spacecrafts and skiffs, etc.

SUMMARY OF THE INVENTION

The present invention provides a radiating device of a brushless DC motor, which has simple structural configuration and solves the heat radiation problem of large power brushless DC motors.

The present invention provides a radiating device of a brushless DC motor, which is suitable for a large power brushless DC motor. The brushless DC motor comprises a bracket, a stator mounted on the bracket and a rotor rotating around the stator, the bracket has an inner chamber, the rotor has an opening facing the inner chamber, wherein the radiating device includes a first radiator and turbine. The first radiator is provided in the inner chamber of the bracket and is thermal coupled with the stator through the bracket so as to send the heat out of the stator. The turbine is provided within the opening of the rotor and is facing a first end of the first radiator so as to discharge the heat sent from the first radiator out of the motor while the turbine is rotating with the rotor.

In an embodiment, the first radiator comprises a plurality of radiating fins which are spaced with an interval, and these radiating fins are arranged circumferentially in the inner chamber of the bracket.

In an embodiment, the rotor is an outer rotor around the stator.

In an embodiment, the radiating device described above further comprises a second radiator located on the bracket and thermal coupled with a second end of the first radiator, which end is far away from the turbine. Wherein the second radiator comprises a plurality of radiating fins which are spaced with an interval, and these radiating fins are arranged to surround the bracket. In a preferred embodiment, the second radiator is spliced by several fan-shaped radiating parts each of which comprises a plurality of said radiating fins.

Additionally, the present invention provides a brushless DC motor, comprising a bracket, a stator mounted on the bracket and a rotor rotating around the stator, the bracket has an inner chamber, one end of the rotor has an opening facing the inner chamber, the motor further comprising a radiating device described above.

BRIEF DESCRIPTION OF THE DRAWINGS

The characteristics and performances of the present invention are further described through the following embodiments and drawings.

DETAILED DESCRIPTION OF THE PREFERRED EMBODIMENT

Figure 1:
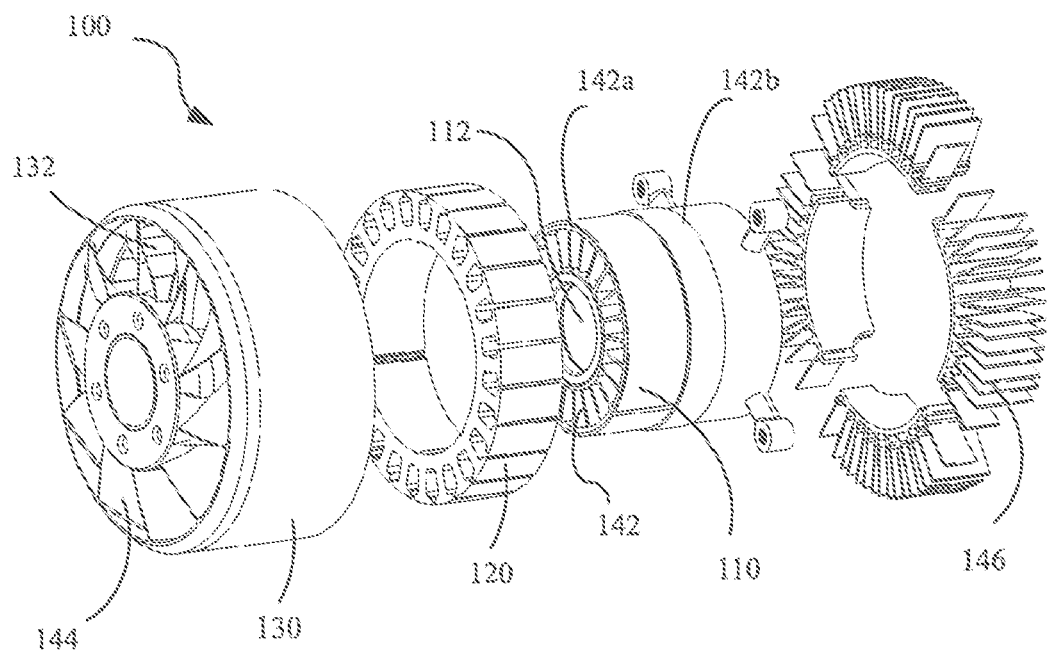
FIG. 1 is an exploded perspective view of a brushless DC motor according to an embodiment of the present invention.
Figure 2:
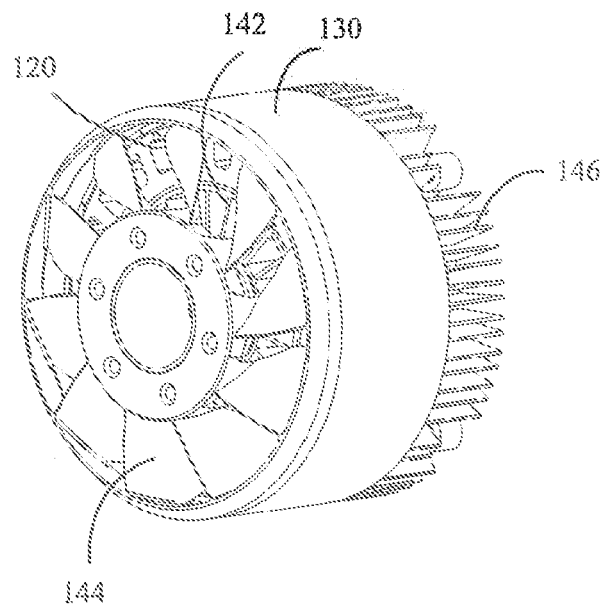
FIG. 2 is an assembled diagram of a brushless DC motor according to an embodiment of the present invention.

Referring to FIG. 1 and FIG. 2, it is an exploded perspective view of the brushless DC motor of an embodiment of the present invention. The brushless DC motor 100 comprises a bracket 110, a stator 120 and a rotor 130, and the driver of the motor 100 is not shown for the sake of conciseness. The stator 120 has an annular structure and is installed on the bracket 110. The stator 120, for example, is an iron core encircled by coils, while the electric current flows through the coils, a rotating magnetic field is generated on the stator 120. The rotor 130 also has an annular structure and is installed around the stator 120. There is a loop of permanent magnet 132 inside the rotor 130, and the permanent magnet 132 induces the rotor 130 to rotate relative to the stator under the effect generated by the stator 120.

In the embodiment of the present invention, the bracket 110 has an inner chamber 112, and a first radiator 142 is arranged along the axial direction in the inner chamber 112, and the first radiator 142 is thermal coupled with the stator 120 through the outer wall of the bracket 110. Preferably, a thermal coupling agent is coated between the outer wall of the bracket 110 and the inner wall of the stator 120. As shown in FIG. 1, the radiator may comprise a plurality of radiating fins which are spaced with an interval, and these radiating fins are arranged circumferentially in the inner chamber 112 of the bracket. Wherein the radiating fins may occupy a ring-shaped part of the inner chamber 112, or may cover the whole inner chamber 112. It should be noticed that FIG. 1 is only for illustration, the first radiator 142 of the present invention is not limited to the shape and arrangement of the radiating fins shown in FIG. 1.

Additionally, the rotor 130 has an opening 134 facing one side of the inner chamber 112 of the bracket 110. A turbine 144 is provided in the opening 134. Referring to FIG. 2, when the motor 100 is in assembled state, the turbine 144 is facing a first end 142a of the first radiator 142 in the inner chamber 112.

The first radiator 142 described above and the turbine 144 constitute the radiating device of the present invention. While the motor is working, the electric current flowing through the coils of the stator 120 will make the coils generate huge amounts of heat, these heat will be quickly led into the radiating fins of the first radiator 142. Meanwhile, along with the rotation of the rotor 130, the turbine 144 located on the rotor 130 functions to exhaust the air so as to discharge the heat in the radiating fins out of the motor, so it can effectively solving the problem of heat radiating and protect parts of the motor from being damaged.

In a preferred embodiment, the radiating device may further comprise a second radiator 146 mounted on the bracket 110, and the second radiator 146 is thermal coupled with a second end 142b of the first radiator 142, which end is far away from the turbine 144. The second radiator 146 may comprise a plurality of radiating fins which are spaced with an interval, and these radiating fins are arranged around the tail end of the bracket and generally distributed on the outer periphery of the bracket. However, the structure of the second radiator 146 is only for illustration, one skilled in the art can choose a suitable structure of the radiator, a suitable shape, size and arrangement of the radiating fins to obtain the desired heat radiating effect.

Figure 3A:
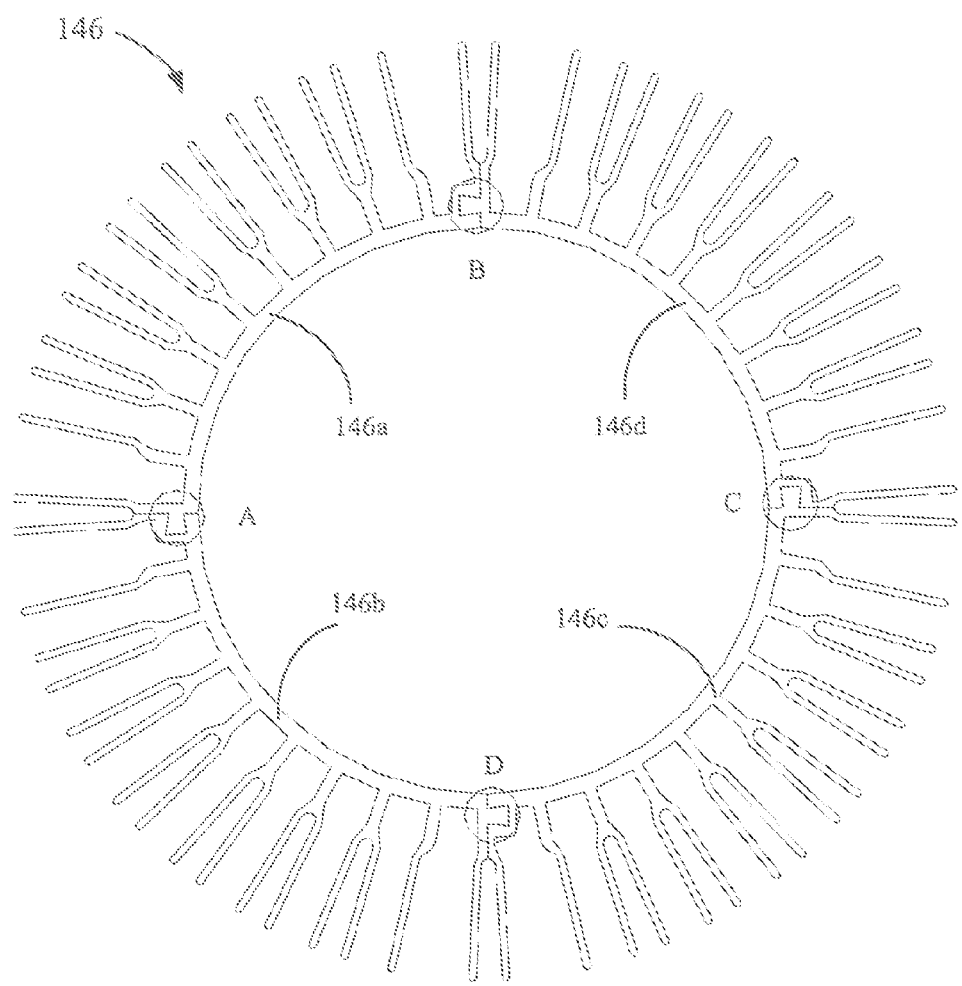
FIG. 3A is a frame diagram of the second radiator in spliced structure according to an embodiment of the present invention.
Figure 3B:
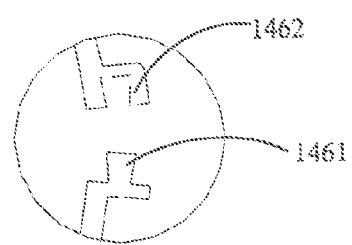
FIG. 3B is a splicing diagram of the parts A~D of FIG. 3A.

As shown in FIG. 3A and FIG. 3B, it is worth mentioning that the second radiator 146 can be spliced by several fan-shaped radiating parts 146a-146d, each of which comprises a plurality of said radiating fins. The connecting parts of each fan-shaped radiating part 146a-146d are spliced by the engaging structure of a bulge 1461 and a groove 1462. These fan-shaped parts can be produced respectively and then spliced to form the second radiator, which reduces the production cost compared with the integrated machining of the second radiator.

APPLICABILITY IN THE INDUSTRY

The radiating device of a brushless DC motor in the present invention has simple structural configuration, it leads heat into the radiating fins quickly when the motor is working, and discharges the heat from the radiating fins out of the motor by the air exhaust function of the turbine at the end of the rotor. Therefore, it perfectly solves the problem of heat discharge of a large power brushless DC motor, and can be used in the brushless DC motor whose power is 5 Kw or over. Thus the brushless DC motor, which is high-effective, energy-saving and environmentally friendly, can be widely used in outdoor products such as paramotor, light manned aircraft and yacht, etc, replacing the traditional oil-machine power.

The invention claimed is:

1. A radiating device of a brushless DC motor, suitable for a large power brushless DC motor, the brushless DC motor comprises a bracket, a stator mounted on the bracket and a rotor rotating relative to the stator, the bracket has an inner chamber, the rotor has an opening facing the inner chamber, wherein the radiating device comprises:
    a first radiator, provided in the inner chamber of the bracket and thermal coupled with the stator through the bracket so as to send the heat out of the stator; and
    a turbine, provided in the opening of the rotor and facing a first end of the first radiator so as to discharge the heat sent out by the first radiator out of the motor while the turbine is rotating along with the rotor.

2. The radiating device of the brushless DC motor, as recited in claim 1, wherein the first radiator comprises a plurality of radiating fins which are spaced with an interval, and these radiating fins are arranged circumferentially in the inner chamber of the bracket.

3. The radiating device of the brushless DC motor, as recited in claim 1, wherein the rotor is an outer rotor around the stator.

4. The radiating device of the brushless DC motor, as recited in claim 1, wherein the radiating device further comprises a second radiator located on the bracket and thermal coupled with a second end of the first radiator, which end is far away from the turbine.

5. The radiating device of the brushless DC motor, as recited in claim 4, wherein the second radiator comprises a plurality of radiating fins which are spaced with an interval, and these radiating fins are arranged to surround the bracket.

6. The radiating device of the brushless DC motor, as recited in claim 5, wherein the second radiator is spliced by several fan-shaped radiating parts each of which comprises a plurality of said radiating fins.

7. A brushless DC motor, comprising a bracket, a stator mounted on the bracket and a rotor rotating relative to the stator, the bracket has an inner chamber, one end of the rotor has an opening facing the inner chamber, further comprising a radiating device, the radiating device comprises:
    a first radiator, provided in the inner chamber of the bracket and thermal coupled with the stator through the bracket to send the heat out of the stator; and
    a turbine, provided in the opening of the rotor and facing a first end of the first radiator so as to discharge the heat sent out by the first radiator out of the motor while the turbine is rotating along with the rotor.

8. The brushless DC motor, as recited in claim 7, wherein the first radiator comprises a plurality of radiating fins which are spaced with an interval, and these radiating fins are arranged circumferentially in the inner chamber of the bracket.

9. The brushless DC motor, as recited in claim 7, wherein the rotor is an outer rotor around the stator.

10. The brushless DC motor, as recited in claim 7, wherein the radiating device further comprises a second radiator located on the bracket and thermal coupled with a second end of the first radiator, which end is far away from the turbine.

11. The brushless DC motor, as recited in claim 10, wherein the second radiator comprises a plurality of radiating fins which are spaced with an interval, and these radiating fins are arranged to surround the bracket.

12. The brushless DC motor, as recited in claim 11, wherein the second radiator is spliced by several fan-shaped radiating parts each of which comprises a plurality of said radiating fins.

* * * * *